United States Patent
Voth et al.

(10) Patent No.: US 11,034,076 B2
(45) Date of Patent: Jun. 15, 2021

(54) BLOW MOLDING MACHINE COMPRISING A TEMPERATURE REGULATING DEVICE

(71) Applicant: KRONES AG, Neutraubling (DE)

(72) Inventors: Klaus Voth, Obertraubling (DE); Armin Buess, Regensburg (DE); Simon Moewes, Regensburg (DE); Konrad Senn, Alteglofsheim (DE); Andreas Brunner, Aufhausen (DE); Thomas Hoellriegl, Teublitz (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/662,071

(22) Filed: Oct. 24, 2019

(65) Prior Publication Data

US 2020/0130250 A1    Apr. 30, 2020

(30) Foreign Application Priority Data

Oct. 25, 2018 (DE) ................. 10 2018 126 706.1

(51) Int. Cl.
| | |
|---|---|
| *B29C 49/48* | (2006.01) |
| *B29C 49/78* | (2006.01) |
| *B29C 49/64* | (2006.01) |
| *B29L 31/00* | (2006.01) |

(52) U.S. Cl.
CPC .......... *B29C 49/786* (2013.01); *B29C 49/48* (2013.01); *B29C 49/64* (2013.01); *B29C 2949/78151* (2013.01); *B29C 2949/78663* (2013.01); *B29C 2949/78857* (2013.01); *B29L 2031/7158* (2013.01)

(58) Field of Classification Search
CPC .... B29C 2049/4838; B29C 2049/4841; B29C 49/4823; B29C 49/48
See application file for complete search history.

(56) References Cited

U.S. PATENT DOCUMENTS

| | | | | |
|---|---|---|---|---|
| 2007/0290388 | A1* | 12/2007 | Feuilloley | ............... B29C 49/78 |
| | | | | 264/40.1 |
| 2010/0203186 | A1* | 8/2010 | Tsau | ........................ B29C 33/02 |
| | | | | 425/526 |
| 2014/0377394 | A1* | 12/2014 | Le Pechour | ............ B29C 49/38 |
| | | | | 425/144 |
| 2018/0104885 | A1 | 4/2018 | Alix et al. | |
| 2018/0162037 | A1* | 6/2018 | Chomel | .................. B29C 49/48 |

FOREIGN PATENT DOCUMENTS

| | | |
|---|---|---|
| DE | 102010006898 A1 | 8/2011 |
| EP | 0069919 A1 | 1/1983 |
| WO | 2016166437 A1 | 10/2016 |
| WO | WO2019025547 A1 | 2/2019 |

* cited by examiner

*Primary Examiner* — Robert B Davis
(74) *Attorney, Agent, or Firm* — Schmeiser, Olsen & Watts, LLP

(57) ABSTRACT

Provided is a machine and method for reshaping plastic parisons into plastic containers, with a mold which has a cavity for the plastic parison to be reshaped, wherein this mold has at least two blow mold parts, wherein each of these blow mold parts has an inner wall which is suitable for forming a region of the plastic parison to be reshaped, wherein these blow mold parts are mounted movably with respect to one another between an open position, in which the blow mold parts are at least partially separated from one another, and a closed position, in which the blow mold parts abut one another, in order together to form the cavity for reshaping the plastic parisons.

10 Claims, 2 Drawing Sheets

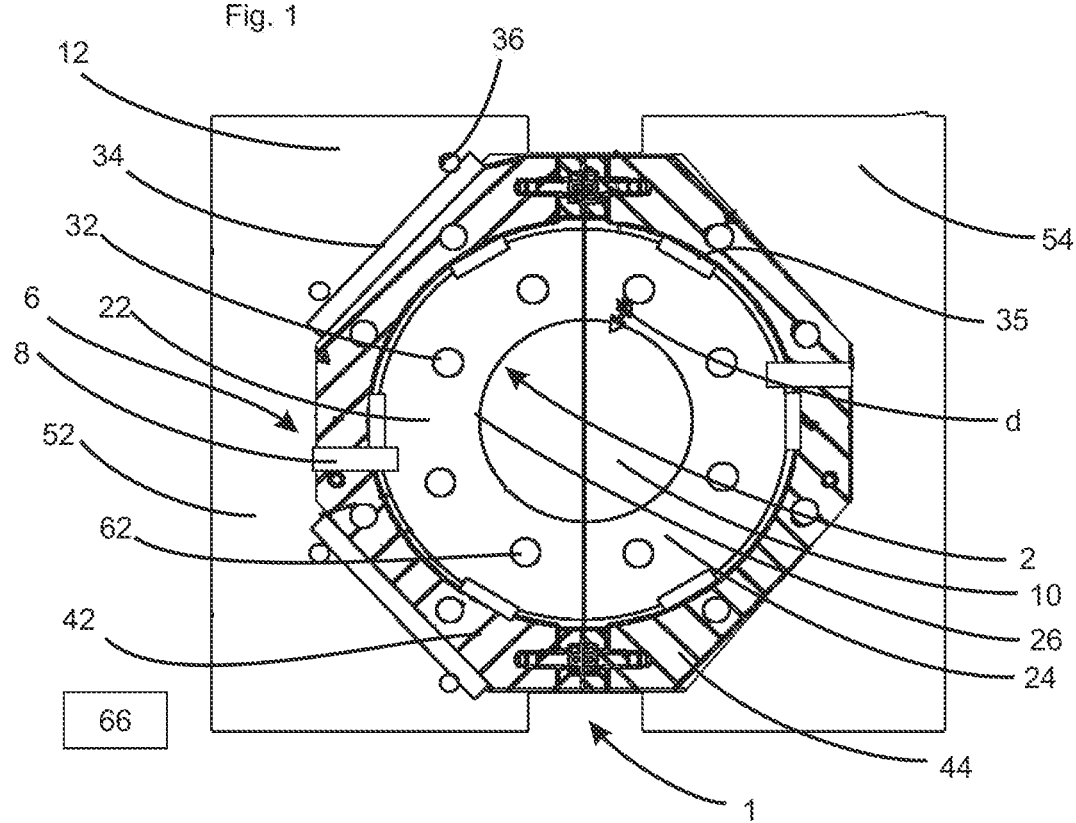
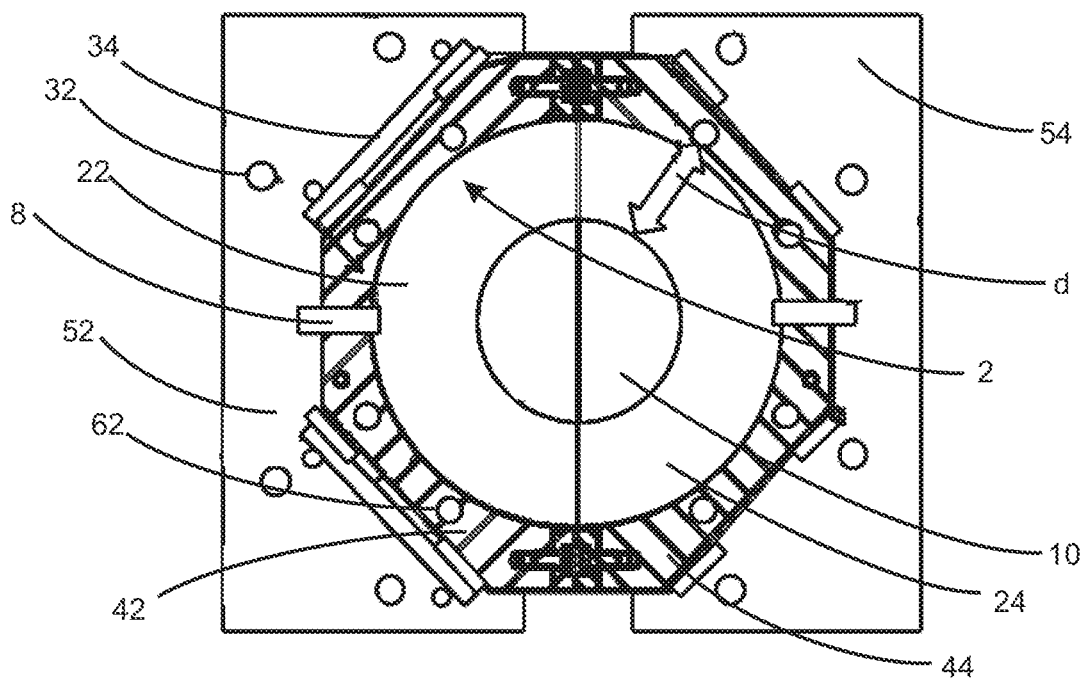

BLOW MOLDING MACHINE COMPRISING A TEMPERATURE REGULATING DEVICE

CROSS-REFERENCE TO RELATED APPLICATION

This application claims priority to German Application No. 10 2018 126 706.1, having a filing date of Oct. 25, 2018, the entire contents of which are hereby incorporated by reference.

FIELD OF TECHNOLOGY

The following relates to a system and a method for reshaping plastic parisons into plastic containers. Such machines and methods have been known for a long time from the art. In this case with this method first of all plastic parisons are heated and subsequently reshaped or blow molded with a medium, in particular a gaseous medium such as for example compressed air, to produce plastic containers. More recently, procedures have become known in which the plastic parisons are expanded directly with a liquid and in particular a beverage to be bottled. The following relates to the two possible procedures.

BACKGROUND

In this case such reshaping devices usually have a blow mold which in its inner wall forms the shape or the negative of the container to be produced. This means that the plastic parison is expanded against this inner wall and so the resulting container acquires the required configuration.

In several processes it is necessary or helpful if the blow mold can be temperature-controlled and in particular heated. In this case different procedures are known for the heating. Thus, for example it is known that this heating of the blow mold parts is carried out by a temperature control medium, for example hot oil or hot water. It is also known from the known art to carry out the heating by means of electrical power.

Likewise, several possibilities are known for electrical heating of blow molds. One possibility known from the internal art in the name of the applicant consists of using thin layers of electrical resistors. This layer is applied directly on the surface of the negative mold of the containers to be produced and thus heats precisely the region of the mold which must be heated, so that the hot material does not remain adhered to the mold. It is also advantageous that with the thin heating layers a thorough control is made possible and temperature changes can be implemented quickly. In addition, it is also possible that heat layers can be supported by one or more other layers, for example by an electrical insulating layer.

Furthermore, it is known for example from DE 10 2010 00689831 that a machine for heating containers has at least one electrical heating element for heating the blow mold. In this case these heating elements are located in cavities in which they are surrounded at least partially by a fluid-like heat transfer system.

A unit for shaping containers is likewise known from WO2016/166437 A1. This unit has heating elements in the support shells of the blow mold parts. Furthermore, a probe is provided, which is provided in the blow mold parts in order to measure the temperature in the environment of the inner wall of the blow mold part.

SUMMARY

An aspect relates to an improved production of containers, in particular for beverages which are hot-filled or are to be hot-filled.

A method which provides no electrical heating elements would be the use of fluids for controlling the temperature of the blow mold, such as for example oil or pressurised water. A plurality of machines which use such liquids for controlling the temperature of the molds are already used on the market. An advantageous feature of the use of oil or water is that usually relatively few components are required, in contrast to the use of electrical heating elements, and that the technology behind such use was already proven to function reliably.

However, the machines and methods described above have the disadvantage that on the one hand thin heating layers are necessary, and for each product these require a negative mold which is covered with this heating layer and an auxiliary layer. Likewise, the power of these layers is limited. A further disadvantage of these layers is also that they require a supply line.

Thus, with each mold change cables have to be unplugged and then plugged in again. Empirical experiences have shown that in this case there is a potential danger in the later application, that is to say for example that workers who are not concentrating, forget the cabling and run the risk of tearing out cables or sockets or in the other case failing to connect them and operating the machine without them.

The disadvantage already set out above relating to damage to the machine by tearing out of objects is theoretically always present when the heating elements or the temperature sensors are located inside the mold or on the mold. Moreover, it should be noted that the plugging and unplugging of the supply lines can lead to increased wear due to careless operation.

In addition, the time required in order to carry out a mold change is prolonged by each individual cable or each individual hose. The more components have to be replaced or wired, the more time is required, and the economic benefit is correspondingly smaller, since during this time the machines do not produce anything.

In machines which are known from the known art and which have heating elements, temperature sensors are also provided. In this case these temperature sensors are usually arranged inside the blow mold part itself and cannot always be regarded as ideal because of the above-mentioned disadvantages. On the other hand, these temperature sensors perform an important task, in order to facilitate the precise temperature control. If the blow molds are to be temperature-controlled with a liquid, such as for example oil or water, this would have the advantage that one single temperature sensor would be sufficient. On the other hand, in these designs the occurrence of leaks is problematic. This can lead to contamination of the machine, which in turn necessitates cleaning.

Likewise, in the production of containers for liquid foodstuffs it is disadvantageous to have risk of contamination, since this could impair the image of the producer's business. Likewise, in the worst-case health problems could ensue for the end consumers. In addition, there is also the danger, that the escape of hot liquid, and in particular hot oil or also hot pressurised water, cause injuries to the machine operators.

Therefore, the aspect of embodiments of the present invention is to provide a method or a machine which has electrical heating elements and also has one or more temperature sensors, which nevertheless facilitate a satisfactory measurement of the temperature of the blow molds. A machine according to embodiments of the invention for reshaping plastic parisons into plastic containers has a mold which has a cavity for the plastic parison to be reshaped, wherein this mold has at least two blow mold parts, wherein each of these blow mold parts has an inner wall which is suitable for forming a region of the plastic parison to be reshaped and wherein these blow mold parts are mounted movably with respect to one another between an open position, in which the blow mold parts are at least partially separated from one another, and a closed position, in which the blow mold parts abut one another, in order together to form the cavity for reshaping the plastic parisons.

Furthermore, the machine has at least two blow mold support shells, wherein a blow mold part is fastened—releasably—to each of these blow mold support shells. It is pointed out here informed that in specific embodiments it is also possible to dispense with the blow mold support shells if the blow mold parts are arranged directly on a blow mold support.

Therefore, the applicant reserves the right also to claim protection for embodiments which dispense with the aforementioned blow mold support shells.

Furthermore, however, the machine according to embodiments of the invention has a thermal regulating device of the mold, which in turn has at least one heating device which is suitable for heat exchange with the mold.

In one embodiment according to the invention the machine has a temperature detection device for detecting a temperature of the mold, wherein this temperature detection device is arranged at least partially in at least one of the blow mold support shells or in a support device which serves to support the blow mold support shells.

Thus, in this embodiment it is proposed that the temperature detection is not arranged in the blow mold parts themselves, but in the support shells thereof or in the blow mold support device. In this way, in the event of a change of blow molds, a replacement of the sensor devices is not necessary simultaneously, so that in particular specific wiring elements can remain.

In a further alternative embodiment, likewise according to embodiments of the invention, the heating device is arranged at least partially and completely in at least one blow mold part.

Therefore, in this embodiment it is proposed that the heating element is arranged in the blow mold part itself, in order thus to ensure direct heating of the blow mold device.

It is pointed out that the two embodiments according to the invention which are described here can not only be used independently of one another used but also can be combined with one another. Therefore, it would also be possible to combine the two configurations with one another, that is to say both to arrange the heating elements in the blow mold parts and also to arrange the temperature detection device in the blow mold support shells and/or the blow mold supports.

Therefore, in the first configuration it is proposed that a sensor device is present, but this is not arranged in the blow mold itself. In a further preferred embodiment, the device has blow mold supports on which the blow mold parts are in each case mounted at least indirectly. In this case it is possible for these blow mold parts to be mounted directly on the blow mold supports, but it would also be possible for these blow mold parts to be indirectly, that is to say in particular by means of the above-mentioned blow mold support shells, on the blow mold supports.

In a preferred embodiment these two blow mold supports are pivotable with respect to one another for opening and closing the blow mold. In a further advantageous embodiment, the blow molds can also have base parts. These base parts can also be temperature controlled. In this case it is possible for heating elements to be arranged in the base parts themselves or in a support device which supports the base part. Two side parts and the base part together form a blow mold or the cavity for reshaping the plastic parisons.

In a further advantageous embodiment, the blow molds are arranged on a blow mold support. Thus, it is possible that a plurality of blow molds, in particular including holders, are arranged on this support. This movable support is particularly a rotatable support.

In a further advantageous embodiment, the device has a plurality of temperature detection devices. In this case for example one temperature detection device could be provided for each blow mold side part. However, a plurality of such sensor devices or temperature detection devices are provided for each blow mold part or for each blow mold support shell. In this way the temperature can be determined in a plurality of regions of the blow mold part. In this case a plurality of temperature detection devices can be provided both in a circumferential direction of the plastic parison to be expanded, and also in the corresponding longitudinal direction of the plastic parisons.

In a further preferred embodiment, it is possible for the temperature detection device to protrude into the blow mold part. However, the sensor device does not protrude into the respective side part.

Thus, embodiments of the invention relate to a machine for producing containers with the aid of at least one of a blow molding and a stretch molding method, in particular for the production of containers which are to be filled with a medium which has a temperature. As mentioned above, the machine comprises inter alia a mold with two side parts or mold halves in which the container is molded from a parison. In this case the mold is temperature controlled with electrical heating elements. In this case the heating elements are arranged in particular in the mold itself, or in a region between the mold and the mold support shell or even in the mold support shell.

In this case it is possible that the heating elements are arranged parallel to a central axis of the mold.

In a further preferred embodiment, the machine has at least two heating devices, particularly preferred at least three heating devices and at least four heating devices for each side part or mold half.

If the heating elements are mounted inside the side parts, it would be advantageous if at the time of a mold change the connectors of these heating elements or heating devices can be connected and disconnected automatically, for example are connected to the current supply by means of a plug connection or a contact connection or a contact surface. As described more precisely below, a part of the plug or a first contact surface is located on the side part or on the mold or on each of the mold halves.

A mating connector and/or a second contact surface is located on the blow molding station or reshaping station, for example on the mold support shell. This is also described more precisely below.

At the time of a mold change the contact between the counterpart pieces is established or broken automatically as a function of the shape.

This type of contact connection would be advantageous in the event of an automatic mold change, for example by a changing device, such as a changing robot. In this embodiment a special feature is the arrangement of the temperature measuring device. This is not mounted in the mold as in the known art described above but is located in the mold support shell or at least in this region. It can fulfil its function by being arranged for example in a bore so that, with the aid of a spring or a pneumatic or hydraulic cylinder or a means acting in a similar manner, it reaches the side parts of the mold and can measure the temperature.

In this case this temperature measuring device can be at least one temperature sensor, at least one per mold half. In one embodiment the heating device can be for instance a heating mat, or also a heating band, a heating tape or the like. In this case, as mentioned above, the heating element can be either a part of the blow mold or can be located between the blow mold and the mold support shell or also a part thereof.

Particularly the heating element is located directly on the mold, so that a high thermal output is achieved.

In addition, a combination of the first heating element, for example the heating mat, with a second heating element is possible. In this case this second heating element could have a circulation which is used for controlling the temperature of the mold. This circulation could contain a fluid, such as for example oil, water, gel-like substances, mixtures and the like.

The provision of a plurality of heating elements opens up more possibilities for controlling the temperature, since heating elements can be used for different purposes. Examples of this would be for example a rough or fine adjustment of the temperature or on the other hand an improved possibility for temperature control in various regions of the product to be produced.

In addition, it would also be conceivable that a heating system functions as a "starting aid" in order to bring the mold more quickly to a desired working temperature. In addition it would also be conceivable that, in particular if the heating element is a fluid or a fluid conduit, this is kept at a lower temperature in order to facilitate a cooling effect instead of a heating effect, so that for example a temperature at which a mold change is possible can be reached more quickly.

Therefore, in a preferred embodiment the machine also has cooling elements for cooling side parts of the blow mold. In this case these cooling elements can be electrical elements, such as for instance Peltier elements, but it would also be conceivable that the cooling elements are formed as fluid cooling circuits.

Due to the use of the electrical heating elements the above-mentioned disadvantages of oil and pressurised water, since here no leakages or contaminants can occur. Due to the arrangement of the heating elements inside the mold support shell or between the mold support shell and the mold, the distance from the heating elements to the mold to be heated is increased, but this ensures that in the event of a mold change the supply lines for the heating elements do not have to be disconnected and connected.

Mounting of the heating elements inside the blow mold, the distance is minimized, and a good heat output is achieved. As the contact is produced automatically by means of a contact surface or a plug at the time of a mold change, the mold change operation per se is accelerated, since no handles are necessary for the connection of the lines. Likewise, there are fewer components to attend to in the changing operation, which in turn is simplified and as a result is less susceptible to faults due to the operation.

If, as mentioned above, the temperature sensor is mounted outside the blow mold, likewise as mentioned above the number of components to be considered to in the event of a mold change is further reduced and thus in turn the potential for danger is reduced and the mold change operation is accelerated. In addition, in this way the mold change can take place more quickly and the machine can take up the production again more quickly.

Due to the above-mentioned possibility of a combination of different heating elements, various advantages can be achieved. Thus, as mentioned above, reaching the operating temperature more quickly could be made possible for instance by actuating or heating with all heating elements. In addition, an energy-saving version would also be conceivable, in which for example both heating elements serve for rough adjustment of the temperature, and the heating elements, for example a heating mat, serve as means for fine adjustment of the individual temperature zones.

Due to the use of heating mats or the like, a better regulation of the temperature zones would be possible, since individual regions can be additionally controlled.

In this way the desired temperatures can be reached relatively simply at certain locations on the blow mold and so preferred characteristics and configurations of the product to be produced, that is to say the container, can be achieved. Due to the mounting of heating elements on the mold and/or in the vicinity thereof, the distance from the negative mold is relatively small.

Accordingly, it is possible that less energy is being wasted and the heating time up to the desired temperature can likewise be reduced.

In a further advantageous embodiment, the temperature detection device contacts at least a portion of at least one blow mold part. As mentioned above, a plurality of temperature detection devices are provided. In this case it is conceivable that a plurality of these temperature detection devices and all these temperature detection devices contact at least one portion of a blow mold part or also a plurality of portions of both or all blow mold parts. Therefore, the temperature detection as a whole is suitable and intended to measure temperatures of a plurality of regions of the blow mold.

In a further advantageous embodiment, the at least one heating device is arranged in at least one blow mold part and/or a blow mold support shell. In this case it is possible that, as mentioned above, the heating device is arranged exclusively in the blow mold part, but it could also be arranged exclusively in the support shell. In a further preferred embodiment at least one heating device is arranged between the blow mold support part and the blow mold support shell and/or between a blow mold support part and a blow mold part arranged thereon.

In a further advantageous embodiment, the above-mentioned temperature regulation device has a control device which controls and/or regulates the at least one heating device as a function of at least one value detected by the temperature detection device.

Such control and/or regulation takes place as a function of the starting values of a plurality of temperature measuring devices. In this case it would also be possible that one or more heating devices are associated with the range detected by a specific temperature measuring device, so that a zone by zone heating of the blow mold parts is possible.

In a particularly preferred embodiment this regulating device has a control loop.

In a further advantageous embodiment, the device has a pretensioning means which forces the temperature detection device in the direction of at least one blow mold part. Thus, it would be possible that the temperature detection device is biased towards a blow mold part.

Furthermore, it would also be possible that the temperature detection devices are arranged in a region which is spaced at a distance from the respective ends of the blow mold part in the circumferential direction. In a mounted state the temperature measuring devices are arranged in a largely central region of the blow mold part.

In a further configuration it would also be possible, additionally or alternatively, that the blow mold part has a bore such as in particular a blind hole in which a temperature is measured contactlessly. Thus, it would be possible that the temperature detection device is constructed for instance as a pyrometer, which can measure a temperature over a predetermined distance for example through a blind hole. Thus, this blind hole could be configured in such a way that it is insulated in its circumferential direction, but the closed end of the blind hole is not insulated, so that the temperature thereof can also be measured contactlessly and over a specific distance.

It would also be possible for a temperature conducting means or a heat conducting element, for example a material which conducts heat very well, to be provided in the blow mold part in the radial direction thereof, starting from the inner wall of the blow mold part. In this way at the outer end of this temperature conducting means the temperature of the inner wall can be determined very conveniently over a specific distance by means of the temperature measurement device.

In this case this heat conducting element is arranged between at least one region of a side part and the temperature detection device.

In a further advantageous embodiment, as mentioned above, the machine has contact means, by which for example the sensor device and/or the heating devices can be supplied with electrical power and/or in order to connect the heating device electrically.

The above-mentioned heat conducting means is particularly arranged between at least one region of the side part and the temperature detection device.

Furthermore, embodiments of the present invention are directed to an arrangement for reshaping plastic parisons into plastic containers with a plurality of machines of the type described above.

In this case these machines are arranged on a movable and in particular rotatable support. In this embodiment the rotatable support is in particular a so-called blow molding wheel, which serves for reshaping the plastic parisons into the plastic containers. As mentioned above, in this case this reshaping can take place both with a gaseous medium and also with a liquid medium and in particular the product to be bottled.

In a further advantageous embodiment, the machine has a delivery device in order to deliver plastic parisons, in particular individually, to the supports or the individual reshaping devices. In a further advantageous embodiment, the machine also has a discharge device such as in particular a discharge star in order to discharge the finished containers from the reshaping devices.

In a further advantageous embodiment, the machine has an energy distributor in order in particular to distribute electrical power to the individual devices on the supports. Thus, in particular power for supplying the heating devices can be distributed to the individual devices. This power distributor may be for example a so-called slip ring which is arranged on a rotating part of the machine and to which the power is delivered by means of corresponding contacts. In addition, a power supply can also take place inductively, for instance by solenoid coils which are arranged on the blow molding wheel and are supplied by stationary permanent magnets.

In a further advantageous embodiment, the machine has a central control and in particular a central control for the individual devices described above and in particular for controlling the temperature thereof.

In a further advantageous embodiment at least one first contact element is arranged on the blow mold part in order to electrically connect the heating device. This contact means may for example be a plug element, but also a for example metallic contact surface, which can be connected by a counterpart contact. At least two electrical contact elements are advantageously arranged on the blow mold part. It would be conceivable that a plurality of heating elements are arranged in the blow mold part and each of these heating devices is electrically connected by means of contact elements.

In a further advantageous embodiment, in a state in which the blow mold part is mounted on the blow mold support shell, the at least one electrical contact element is arranged on a surface facing the blow mold support shell. If no blow mold support shell is present the at least one electrical contact element can be arranged on a surface facing the blow mold support surface.

In a further advantageous embodiment, a second electrical contact element is arranged on the blow mold support shell and in a mounted state, that is to say a state in which the blow mold part is arranged on the blow mold support shell, is in electrically conductive contact with the first electrical contact element. In this way for example the heating devices can be supplied with electrical power.

However, alternatively or additionally, it would also be possible that corresponding contact elements are arranged on the blow mold support itself, in particular if the blow mold parts are provided directly on the blow mold support. In addition, it would also be conceivable that contact pins or the like which extend through the support shells are provided on the blow mold support.

In a preferred embodiment at least one of the two contact elements is pretensioned in particular by means of a spring device, in a mounted state, in the direction of the respective other contact element. Thus, contact elements which are pretensioned in the direction of the contact elements in the blow mold parts can be for example provided on the blow mold support shells.

In a further advantageous embodiment, the contacts between these contact elements can be automatically released and/or closed.

Electrical connections between these contact elements of the heating element or the heating device can be automatically released and/or can be separated and/or also can be connected. Thus, in particular changing devices, such as changing robots, can be used, which also establish or separate these electrical connections automatically.

As mentioned above, the machine particularly has at least one and particularly a plurality of temperature detection devices for detecting a temperature in or of the mold.

In a further advantageous embodiment this temperature detection device is arranged at least partially in at least one of the blow mold support shells or in a support device which serves to support the blow mold support shells. Also, in this way, in the event of a change of the blow mold parts it is not necessary that any electrical connections also have to be released. In this way a blow mold change can also be carried out more easily.

In this way the machine can be adapted very precisely to the requirements of the respective machine manufacturer. In the case of manufacturers who require a frequent change of blow mold, it can be provided that the heating devices and/or the temperature detection devices are arranged respectively in the support shells or in the support part in order in this way to reduce the contacts to be broken and made electrically. If conversely the manufacturer rather rarely requires a change of blow mold, it can be advantageous if for example both the heating devices and also the temperature detection devices are arranged in the blow mold part and are in each case electrically connected.

In a further advantageous embodiment, the temperature detection device does not protrude into the blow mold part.

In a further advantageous embodiment, the temperature detection device is suitable and intended for determining a temperature of at least one region of the blow mold parts.

Furthermore, embodiments of the present invention is directed to a method for reshaping plastic parisons into plastic containers by means of a mold which has a cavity for the plastic parison to be reshaped, wherein this mold has two blow mold parts and wherein each of these blow mold parts has an inner wall which forms a region of plastic parison to be reshaped.

In this case these blow mold parts are movable or are moved with respect to one another between an open position, in which the blow mold parts are at least partially separated from one another, and a closed position, in which the blow mold parts abut one another, in order together to form the cavity for reshaping the plastic parisons. Furthermore, the machine has at least two blow mold support shells, wherein a blow mold part is fastened—releasably—to each of these blow mold support shells and a heating device heats the mold at least intermittently.

In one embodiment according to embodiments of the invention a temperature detection device detects a temperature of the mold and/or at least one region of the mold, wherein this temperature detection device is arranged at least partially in one of the blow mold support shells or in a support device which serves to support the blow mold support shells and/or the blow mold parts.

In a further (additional or alternative) embodiment according to embodiments of the invention, the heating device is arranged at least partially and completely in at least one blow mold part. In this way heating of the blow mold part takes place here by means of a heating device which is arranged in the blow mold part itself. In a further preferred method, a machine as described above is used. Further advantages and embodiments are apparent from the appended drawings.

BRIEF DESCRIPTION

Some of the embodiments will be described in detail, with reference to the following figures, wherein like designations denote like members, wherein:

FIG. 1 shows a machine according to embodiments of the invention in a first embodiment;

FIG. 2 shows a machine according to embodiments of the invention in a second embodiment.

DETAILED DESCRIPTION

Figure 3:
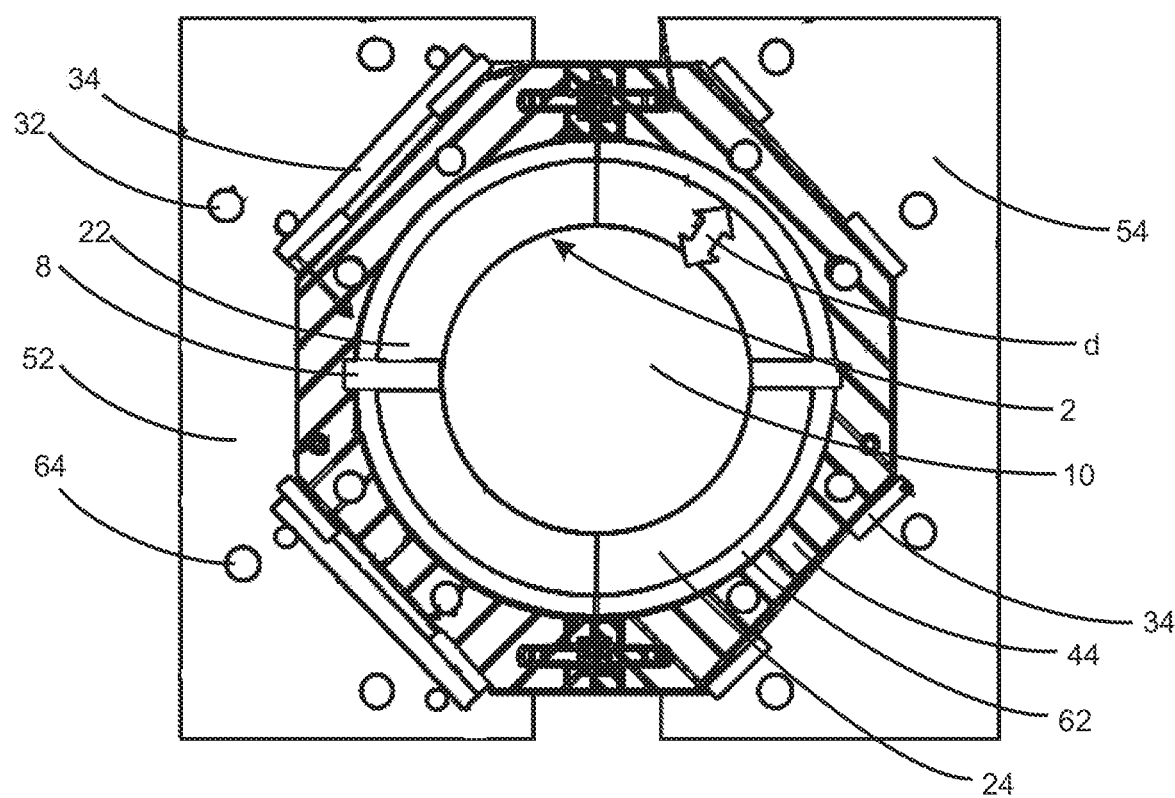
FIG. 3 shows a machine according to embodiments of the invention in a third embodiment.

FIG. 1 shows a representation of a reshaping station 1 in a first embodiment. In this case two blow mold support parts 52 and 54 are provided. These blow mold support parts 52 and 54 are pivotable with respect to one another, in order in this way to open and to close the blow mold. Blow mold support shells 42 and 44 are arranged respectively on the blow mold support parts 52 and 54. In this case these blow mold support shells, or the parts thereof can be screwed for example onto the blow mold support parts 52 and 54 (also generally designated above as the support device). The reference 36 relates to a sealing device and the reference 34 relates to a mounting plate.

The blow mold support parts 22 and 24 are in turn arranged on the blow mold support shells 42 and 44. The plastic parison 10 is pressed against the mold formed here by the side parts 22 and 24 or against the inner wall 26 thereof. The blow mold parts 22, 24 are components of the mold designated by 2.

The reference 8 designates a temperature sensor. Two temperature sensors are provided here which are provided respectively in the blow mold support shells 42 and 44, but extend with their end portions into the blow mold parts 22 and 24.

The references 62 relate to heating elements or heating devices which are arranged here in the blow mold parts 22 or 24. In this case these heating elements 62 can be rod-shaped or pin-shaped and extend here perpendicular to the drawing plane and/or perpendicular to the longitudinal direction of the plastic parisons.

The reference 6 relates schematically to a regulating device for the mold 2, more precisely for a temperature of the blow mold parts 22, 24. This regulating device has at least the heating device 62, the temperature detection device or the temperature sensor 8 and a control and/or regulating device 66 (only schematically illustrated).

The arrangement of the heating elements illustrated in FIG. 1 produces a very small distance d between the heating elements and the hollow body or plastic parison 10.

The references 35 relate to insulations which here are arranged spaced apart from one another in the peripheral direction.

Furthermore, the blow mold parts 22 and 24 have contact elements, in order to contact the heating devices 62 or to supply them with electrical power. In this case, in the event of a change of the blow mold or the blow mold parts 22 and 24, these electrical connections can be automatically disconnected and connected again.

FIG. 2 shows a further embodiment of a machine according to the invention. In this embodiment there is a significant difference from the embodiment illustrated in FIG. 1 in that here the heating devices 62 are not arranged in the blow mold parts 22 and 24, but in the blow mold support shells 42, 44. In this way the distance d between the heating devices and the hollow body 10 is significantly greater than in the embodiment event illustrated in FIG. 1. However, the advantage is that no electrical connections must be broken or made when the blow mold parts 22, 24 are changed.

The reference 32 designates a channel through which a coolant can flow. In this way a cooling of the blow mold parts is also possible. As mentioned above, in this way a precise temperature of the blow mold parts 22 and 24 and of the base part (not shown) can be set.

FIG. 3 shows a further embodiment of a machine according to the invention. In this embodiment a first heating device 62 is provided in the form of a heating mat which is arranged here between the blow mold side parts 22 and 24 and the support shells 42 and 44. In this way the distance d between the plastic parison 10 and the heating elements increases relative to the embodiment shown in FIG. 1, but decreases relative to the embodiment shown in FIG. 2. It is also possible here that the heating mat 62 remains on the mold support shells 42 and 44. Advantageously, however the heating mat here is also arranged on the blow mold and is therefore changed therewith.

The references 64 relate to second heating devices which are arranged here in the blow mold supports 52 and 54. In this way, as mentioned above, heating can be quicker due to the use of all heating devices.

In the embodiment illustrated in FIG. 3 the temperature measuring devices 8 are arranged substantially within the blow mold parts 22 and 24. In this way a more direct measurement of the temperature of the inner wall of the blow mold device 2 can be achieved.

On the other hand, in the embodiment shown in FIG. 2 the temperature measuring device is arranged substantially in the blow mold support shells 42 and 44 and, however, contacts the blow mold side parts 22 and 24 as also in the embodiment shown in FIG. 1.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCES 1 reshaping station
2 mold
6 regulating device
8 temperature measuring device, sensor
10 plastic parison
22, 24 blow mold parts
32 channel
34 mounting plate
35 insulation
36 sealing device
42, 44 support shells
52, 54 support devices
62 heating device
66 control device
d spacing

The invention claimed is:

1. A machine for reshaping plastic parisons into plastic containers, with
 a mold which has a cavity for the plastic parison to be reshaped, wherein this mold has at least two blow mold parts, wherein each of these blow mold parts has an inner wall which is suitable for forming a region of the plastic parison to be reshaped and wherein these blow mold parts are mounted movably with respect to one another between an open position, in which the blow mold parts are at least partially separated from one another, and a closed position, in which the blow mold parts abut one another, in order together to form the cavity for reshaping the plastic parisons;
 at least two blow mold support shells, wherein a blow mold part is fastened releasably to each of these blow mold support shells;
 a thermal regulating device of the mold, which has at least one heating device which is suitable for heat exchange with the mold;
 wherein the heating device is arranged at least partially and completely in at least one blow mold part, wherein the machine has a temperature detection device for detecting a temperature of the mold, wherein the temperature detection device is arranged at least partially in at least one of the blow mold support shells and/or in a support device, which is configured to support the blow mold support shells.

2. The machine according to claim 1, wherein the heating device is an electrically operated heating device.

3. The machine according to claim 2, wherein at least one first electrical contact element is arranged on the blow mold part in order to connect the heating device electrically to the blow mold part.

4. The machine according to claim 3, wherein in a state in which the blow mold part is mounted on a blow mold support shell, the at least one first electrical contact element is arranged on a surface of the blow mold part facing the blow mold support shell.

5. The machine according to claim 4, wherein a second electrical contact element is arranged on the blow mold support shell and in a mounted state is in electrically conductive contact with the first electrical contact element.

6. The machine according to claim 1, wherein an electrical connection for electrical supply to the heating element can be automatically released or separated.

7. The machine according to claim 1, wherein the temperature detection device is suitable and intended for determining a temperature of at least one region of the blow mold parts.

8. The machine according to claim 1 wherein the regulating device has a control device which controls the at least one heating device as a function of at least one value detected by the temperature detection device.

9. An arrangement for reshaping plastic parisons into plastic containers with a plurality of devices according to claim 1, wherein these devices are arranged on a movable and in particular rotatable support.

10. A method for reshaping plastic parisons into plastic containers by a mold which has a cavity for the plastic parison to be reshaped, and wherein the mold has two blow mold parts, wherein each of the blow mold parts has an inner wall which forms a region of the plastic parison to be reshaped, the method comprising:
 moving the blow mold parts with respect to one another between an open position, in which the blow mold parts are at least partially separated from one another, and a closed position, in which the blow mold parts abut one another, in order together to form the cavity for reshaping the plastic parisons;
 providing at least two blow mold support shells, wherein a blow mold part is fastened releasably to each of these blow mold support shells; and
 heating with a heating device the mold at least intermittently,
 wherein the heating device is arranged at least partially and completely in at least one blow mold part, wherein a temperature detection device for detecting a temperature of the mold is provided, and wherein the temperature detection device is arranged at least partially in at least one of the blow mold support shells and/or in a support device, which is configured to support the blow mold support shells.

* * * * *